US008752192B2

(12) United States Patent
Odaka et al.

(10) Patent No.: US 8,752,192 B2
(45) Date of Patent: Jun. 10, 2014

(54) INFORMATION PROCESSING APPARATUS, INFORMATION PROCESSING METHOD, AND COMPUTER PROGRAM PRODUCT

(75) Inventors: Kenji Odaka, Kanagawa (JP); Yoshiki Terashima, Kanagawa (JP); Satoshi Ozaki, Kanagawa (JP); Shirou Wakayama, Kanagawa (JP); Keiichi Teramoto, Kanagawa (JP); Eiji Tokita, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 730 days.

(21) Appl. No.: 12/545,556

(22) Filed: Aug. 21, 2009

(65) Prior Publication Data
US 2010/0050269 A1   Feb. 25, 2010

(30) Foreign Application Priority Data

Aug. 25, 2008   (JP) ................................. 2008-216011

(51) Int. Cl.
*G06F 21/00* (2013.01)
*G06F 21/10* (2013.01)
*G11B 27/034* (2006.01)
*G11B 20/00* (2006.01)
*G06F 21/62* (2013.01)
*H04L 29/06* (2006.01)

(52) U.S. Cl.
CPC ............. *G06F 21/10* (2013.01); *G11B 27/034* (2013.01); *G11B 20/00086* (2013.01); *G06F 21/6218* (2013.01); *H04L 63/0428* (2013.01); *H04L 63/101* (2013.01)
USPC ........ 726/27; 726/2; 726/26; 726/28; 726/29; 726/30; 726/31; 726/32; 726/33; 726/34; 726/35; 726/36

(58) Field of Classification Search
CPC   G11B 27/034; G11B 20/00086; G06F 21/10; G06F 21/6218; H04L 2463/101; H04L 63/0428
USPC .................................................. 726/27, 26, 2
See application file for complete search history.

(56) References Cited

U.S. PATENT DOCUMENTS 5,818,435 A *  10/1998  Kozuka et al. ................. 715/202
7,024,156 B2 *   4/2006  Kawamata et al. .......... 455/3.02
(Continued)

FOREIGN PATENT DOCUMENTS

JP          09-311850      2/1997
JP       09311850 A  *  12/1997   .............. G06F 17/00
(Continued)

OTHER PUBLICATIONS

JP09311850, Mitsui, Feb. 1997 (note that it is an english translation of the JP2004070646 A and it was downloaded from JP websites).*

(Continued)

*Primary Examiner* — Andy Rao
*Assistant Examiner* — Shan Elahi
(74) *Attorney, Agent, or Firm* — Ohlandt, Greeley, Ruggiero & Perle, L.L.P.

(57) ABSTRACT

Whether a combination method defined in an output rule satisfies a combination condition of each content specified in a play list is judged in order of priority defined in a priority list. Based on the judgment result, the output rule is edited in such a manner that the combination condition of each content specified in the play list is satisfied. The resources of the combination target contents specified in the play list are combined in accordance with the combination method of the edited output rule.

9 Claims, 6 Drawing Sheets

(56) References Cited

U.S. PATENT DOCUMENTS

| | | | |
|---|---|---|---|
| 7,173,730 B1* | 2/2007 | Suzuki et al. | 358/1.16 |
| 7,826,709 B2* | 11/2010 | Moriya et al. | 715/202 |
| 8,156,417 B2* | 4/2012 | Sudoh et al. | 715/202 |
| 8,201,216 B2* | 6/2012 | Cha et al. | 726/2 |
| 8,250,073 B2* | 8/2012 | Wong | 707/736 |
| 8,261,359 B2* | 9/2012 | Levine et al. | 726/26 |
| 8,266,119 B2* | 9/2012 | Murata et al. | 707/694 |
| 2001/0028787 A1* | 10/2001 | Nomura et al. | 386/69 |
| 2002/0025777 A1* | 2/2002 | Kawamata et al. | 455/3.05 |
| 2002/0091925 A1* | 7/2002 | Suzuki et al. | 713/168 |
| 2003/0145338 A1* | 7/2003 | Harrington | 725/136 |
| 2005/0216413 A1* | 9/2005 | Murakami et al. | 705/51 |
| 2006/0085343 A1* | 4/2006 | Lisanke et al. | 705/50 |
| 2006/0195911 A1* | 8/2006 | Takashima | 726/27 |
| 2006/0271486 A1* | 11/2006 | Cross et al. | 705/51 |
| 2007/0044159 A1* | 2/2007 | Ishiguro | 726/27 |
| 2007/0185972 A1* | 8/2007 | Won et al. | 709/217 |
| 2008/0219639 A1 | 9/2008 | Terashima et al. | |

FOREIGN PATENT DOCUMENTS

| | | | | | |
|---|---|---|---|---|---|
| JP | 2002-049840 A | 2/2002 | | | |
| JP | 2002-169910 A | 6/2002 | | | |
| JP | 2002-334266 A | 11/2002 | | | |
| JP | 2004-029859 A | 1/2004 | | | |
| JP | 2004-070646 A | 3/2004 | | | |
| JP | 2004070646 A | * | 3/2004 | | G06F 19/00 |
| JP | 2004-145661 A | 5/2004 | | | |
| JP | 2006-099646 A | 4/2006 | | | |
| JP | 2006-119178 A | 5/2006 | | | |
| JP | 2006-134146 A | 5/2006 | | | |
| JP | 2006/209619 | 8/2006 | | | |
| JP | 2006-350971 | 12/2006 | | | |

OTHER PUBLICATIONS

JP 2004070646 A, Masuguchi, Hideaki, Mar. 2004 (note that it is an english translation of the JP2004070646 A and it was downloaded from JP websites).*

JP 09311850 A, Mitsui, Feb. 1997 (note that it is an english translation of the JP09311850 A and it was downloaded from JP websites).*

U.S. Appl. No. 12/407,353, filed Mar. 19, 2009, Wakayama, et al.

U.S. Appl. No. 12/407,274, filed Mar. 19, 2009, Teramoto, et al.

Japanese Office Action (with English translation) dated Mar. 21, 2012 from JP 2008-216011.

Japanese Office Action (with English translation) dated Dec. 18, 2012 from JP 2008-216011, 9 pages.

* cited by examiner

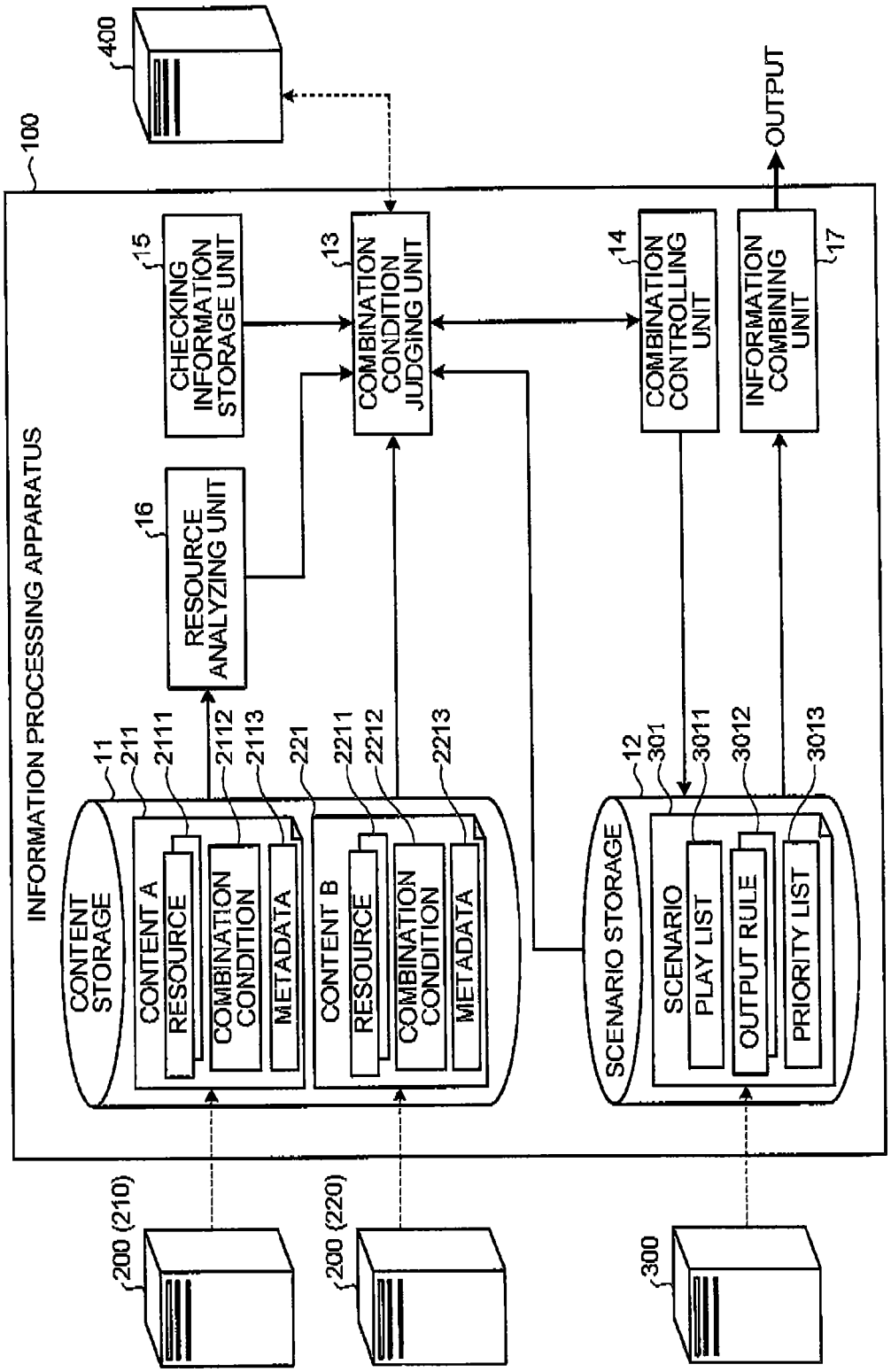

FIG.2

```
<?xml version="1.0" encoding="UTF-8"?>
<combinations>
  <condition>
        <target>
          <rating>over 18</rating>
        </target>
        <method>continuous play</method>
  </condition>
</combinations>
```

FIG.3

```
<?xml version="1.0" encoding="UTF-8"?>
<combinations>
  <condition>
        <target>
          <genre>adult</genre>
        </target>
        <method>same screeen</method>
  </condition>
</combinations>
```

FIG.4

```
<?xml version="1.0" encoding="UTF-8"?>
<priorities>
  <priority level="1">
        <name>toshiba company</name>
  </priority>
  <priority level="2">
        <name>xxx company</name>
  </priority>
</priorities>
```

FIG.5

| DOES CONTENT B SATISFY COMBINATION CONDITION OF CONTENT A? | YES | YES | NO | NO |
|---|---|---|---|---|
| DOES CONTENT A SATISFY COMBINATION CONDITION OF CONTENT B? | YES | NO | YES | NO |
| COMBINATION RESULT | CONTENTS A AND B | CONTENT A | CONTENT A | CONTENT A |

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from the prior Japanese Patent Application No. 2008-216011, filed on Aug. 25, 2008; the entire contents of which are incorporated herein by reference.

BACKGROUND OF THE INVENTION

1. Field of the Invention

The present invention relates to an information processing apparatus, an information processing method, and a computer program product for outputting multiple contents in combination.

2. Description of the Related Art

As the variety of content business increases and more contents go on line recent years, right holders such as companies and individuals offer more advertisement contents or the like. Contents offered by different right holders may be combined in a form of a program or the like and offered to viewers. Various technologies for a device that offers multiple contents in combination have been suggested. Those technologies include controls performed by focusing on communication protocols or data formats and controls for ensuring conditions of using original contents when they are cited (see JP-A 2006-209619 and 2006-350971 (KOKAI)).

When multiple contents are offered in combination to viewers, the combination may incur damage to a right holder. For example, when a content presented by a company that places importance on brand image is displayed simultaneously or sequentially with a content containing sexual description, the image of the brand-image emphasizing company may be impaired, causing damage.

With the conventional technologies, the usage condition of a content can be controlled when it is singly used. However, the control cannot be performed on the conditions of the combined contents because the control is not designed to take the relationship of the contents into account. In other words, the contents can be combined, regardless of their types, as long as the usage condition of each content is satisfied. It is therefore difficult to solve the above problem.

SUMMARY OF THE INVENTION

According to one aspect of the present invention, an information processing apparatus includes a content storage unit that stores a plurality of contents each including resources that are individually usable and a combination condition that describes a restriction in using the resources in combination with other resources; a scenario storage unit that stores a scenario including a play list specifying combination target contents from among the contents, an output rule defining a combination method for combining resources included in the combination target contents, and a priority list defining priorities of the combination target contents; a judging unit that judges whether the combination method defined in the output rule satisfies the combination condition of each of the combination target contents specified in the play list, in order of the priorities defined in the priority list; an editing unit that edits the output rule based on a judgment result obtained by the judging unit in such a manner that the combination condition of each of the contents specified in the play list is satisfied; and a combining unit that combines the resources of the contents specified in the play list, based on the combination method of the output rule edited by the editing unit.

According to another aspect of the present invention, an information processing method implemented in an information processing apparatus that combines and outputs individually usable resources, the apparatus includes a content storage unit that stores a plurality of contents each including the resources and a combination condition that describes a restriction in using the resources in combination with other resources; and a scenario storage unit that stores a scenario including a play list specifying combination target contents from among the contents, an output rule defining a combination method for combining resources included in the combination target contents, and a priority list defining priorities of the combination target contents, the method includes judging whether the combination method defined in the output rule satisfies the combination condition of each of the contents specified in the play list, in order of the priorities defined in the priority list; editing the output rule based on a judgment result obtained by the judging in such a manner that the combination condition of each of the combination target contents specified in the play list is satisfied; and combining the resources of the contents specified in the play list, based on the combination method of the output rule edited by the editing.

A computer program product according to still another aspect of the present invention causes a computer to perform the method according to the present invention.

BRIEF DESCRIPTION OF THE DRAWINGS

FIG. 1 is a diagram for illustrating the structure of an information processing system;

FIG. 2 is a diagram for illustrating an example of a combination condition described in the XML;

FIG. 3 is a diagram for illustrating another example of a combination condition described in the XML;

FIG. 4 is a diagram for illustrating an example of a priority list described in the XML;

FIG. 5 is a diagram for illustrating examples of combination condition judgment results;

DETAILED DESCRIPTION OF THE INVENTION

Figure 6:
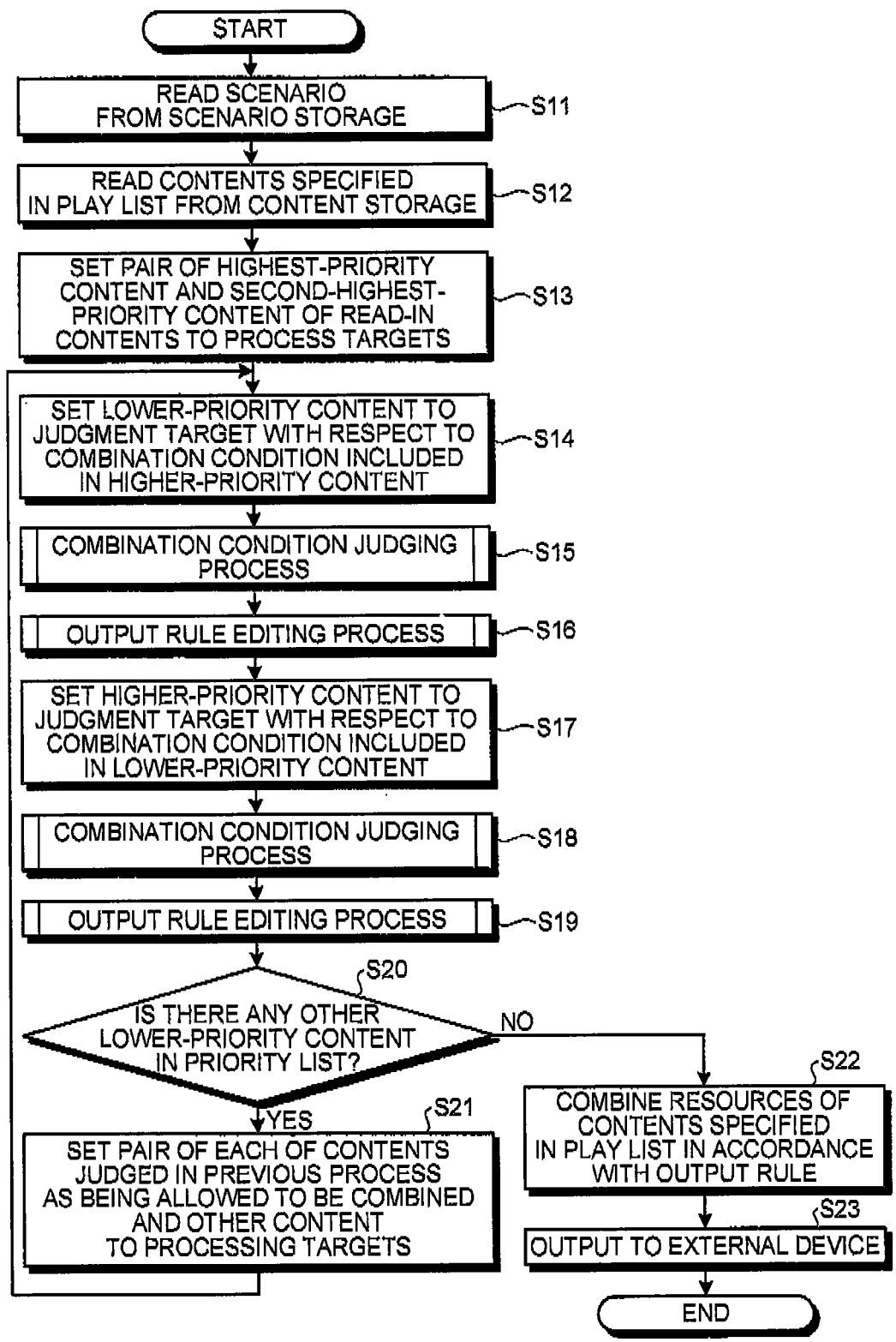
FIG. 6 is a flowchart of the procedure of an information combining process.

Exemplary embodiments of the information processing apparatus, the information processing method, and the computer program product according to the present invention are explained in detail below with reference to the attached drawings.

In FIG. 1, the information processing system includes an information processing apparatus 100, multiple content providing devices 200, a scenario providing device 300, and a checking information storage device 400 to which an inquiry about later-described combination conditions is sent. The devices are connected to one another by way of a not-shown network. The numbers of content providing devices 200, scenario providing devices 300, and checking information storage devices 400 of the system are not limited to the example of FIG. 1.

The information processing apparatus 100 is a server that stores therein contents provided by the content providing devices 200 and a scenario provided by the scenario providing device 300 and outputs (offers) contents combined according to this scenario to an external device.

In FIG. 1, the information processing apparatus 100 is described to show components of the functional structure. The information processing apparatus 100 includes a content storage 11, a scenario storage 12, a combination condition judging unit 13, a combination controlling unit 14, a checking information storage unit 15, a resource analyzing unit 16, and an information combining unit 17.

The content storage 11 stores therein contents provided by the content providing devices 200, which will be discussed later. Each of the content providing devices 200 is a PC or a server managed by a right holding company or individual, or a third party commissioned to provide contents by the right holder. Each content providing device 200 provides the information processing apparatus 100 with contents by way of the not-shown network. It is assumed here that each right holder of a content realizes that their content may be combined in any form with contents of others.

In FIG. 1, contents 211 and 221 are given as example contents that are provided by the content providing devices 200 (210 and 220) and stored in the content storage 11. The number of contents stored in the content storage 11 is not limited thereto, however.

A content includes one resource or more that is individually used (played back), and a combination condition. A resource here represents data in a text, image, audio, or video file, or a combination of these files. For example, advertising video or a logotype of a product can be a resource.

A combination condition is data that describes restrictions for combining a resource of its own content with a resource of a content of someone else. The combination condition includes the following two items of information:
(1) Information specifying contents that are allowed/not allowed to combine with
Examples:
  Contents including descriptions of violence or sexuality are not allowed.
  Contents provided by specific right holders such as competitors are not allowed.
(2) Information for restricting play-back method
Examples:
  Disabling playback on the same screen
  Disabling sequential playback
  Enabling sequential same-screen playback for part of contents such as a logotype
  Enabling sequential same-screen playback only when displaying the origin of its citation or reference The method of describing the combination condition is not specifically limited, and a language such as XML may be used for the description. FIGS. 2 and 3 are diagrams for showing examples of combination conditions described in the XML. The combination condition of FIG. 2 stipulates that the content is not allowed to be played back continuously with any content whose rating information indicates "viewable for only people 18 and older (over 18)". The combination condition of FIG. 3 stipulates that the content is not allowed to be played back on a screen together with any content designating "adult" as a genre. Multiple combination conditions may be given to a single content, in multiple XML files each describing one of the combination conditions, or in a single file listing all the combination conditions.

A content may include data other than the resource and combination conditions that are explained above. In FIG. 1, for example, the contents include metadata (2113, 2213) in addition to the resources (2111, 2211) and the combination conditions (2112, 2212).

The metadata is additional data describing content provider information such as the name of the company, the information on the content (resource) regarding the genre and rating for descriptions of violence and sexuality, and the like. The information of the metadata is used in combination condition judgment, which will be explained later.

In FIG. 1, the scenario storage 12 is a device that stores therein a scenario provided by the scenario providing device 300, which will be explained later. The scenario providing device 300 is a PC or a server managed by a scenario provider such as a program producing company and individual or a third party commissioned to provide a scenario by the scenario provider. The scenario providing device 300 provides the information processing apparatus 100 with a scenario by way of the not-shown network. The scenario provider may be a content provider.

The scenario provided by the scenario providing device 300 is data that is based on to designate a combination of contents and a playback method. The scenario includes at least a play list, an output rule, and a priority list. In FIG. 1, a scenario 301 provided by the scenario providing device 300 is stored in the scenario storage 12, and the scenario 301 includes a play list 3011, an output rule 3012, and a priority list 3013.

In the play list, information for specifying combination target contents is described. The information may include the names of the contents, the URLs of the content providers, and the names of the companies that are the right holders of the contents.

The output rule designates the method of combining resources of the contents. The method may be such that the resources are sequentially played back or displayed on the same screen, or that part of a resource is combined with other resources. The method is not limited thereto, however.

The priority list indicates priorities of the contents designated in the play list. The priorities define which content is to be preferentially used when a conflict occurs in the later-described combination condition judgment. FIG. 4 is a diagram for illustrating an example of a priority list described in the XML. In this priority list, "toshiba company" is designated as a content that is given the highest priority, and "xxx company" is designated as a content that is given the second highest priority.

The combination condition judging unit 13 judges whether the combining method defined in the output rule satisfies the combination condition of each content designated in the play list, in order of priority defined in the priority list. More specifically, the combination condition judging unit 13 reads combination target contents designated in the play list from the content storage 11 by referring to the scenario stored in the scenario storage 12. Then, based on the priorities of the contents shown in the priority list and the output rule in the scenario, the combination condition judging unit 13 sequentially determines whether the combination condition included in one content is satisfied by the other content. The combination condition judging unit 13 also writes the judgment result of the combination conditions in a not-shown internal buffer, and notifies the combination controlling unit 14 of the judgment result.

Based on the judgment result obtained by the combination condition judging unit 13, the combination controlling unit 14 edits the output rule in such a manner that the combination conditions of the contents defined in the play list can be satisfied. More specifically, when information indicating the removal of a specific content is written in the internal buffer, the combination controlling unit 14 searches the output rule for a position at which the resource of this specific content is used (hereinafter, "output setting"). Then, the combination controlling unit 14 edits (removes, for example) the description of the output setting so that this resource would not be used.

The operations of the combination condition judging unit 13 and the combination controlling unit 14 are now explained. First, the combination condition judging unit 13 refers to the priority list of the scenario stored in the scenario storage 12, and makes a judgment on the output rule of two highest-priority contents, as to whether the combination condition of the higher-priority content of the two is satisfied by the lower-priority content. Then, the combination condition judging unit 13 notifies the combination controlling unit 14 of the judgment result by way of the internal buffer. When the combination condition is not satisfied, the combination condition judging unit 13 writes information indicating that the lower-priority content is to be removed, in the internal buffer as a judgment result. Upon receiving the judgment result by way of the internal buffer, the combination controlling unit 14 edits the output setting of the content so that the combination condition can be satisfied.

After making the judgment on the combination condition of the higher-priority content with respect to the lower-priority content, the combination condition judging unit 13 judges whether the combination condition of the lower-priority content is satisfied by the higher-priority content. When the combination condition is not satisfied, the combination condition judging unit 13 writes information indicating that the lower-priority content is to be removed, in the internal buffer as a judgment result. Upon receiving the judgment result by way of the internal buffer, the combination controlling unit 14 edits the output setting of the content so that the combination condition is satisfied.

In this manner, the combination condition judging unit 13 makes judgments on the combination conditions in two ways for the higher-priority and lower-priority contents, When a conflict occurs in the combination conditions in either way, the removal of the lower-priority content is always output as a judgment result so that the higher-priority can be maintained.

Any of the following methods may be employed for the combination condition judgment. As the first method, the description of the metadata included in the judgment target content is compared with the combination condition to judge whether the combination condition is satisfied. For example, when the combination condition of the content A contains a rating restriction, it is compared with the rating information described in the metadata of the content B to judge whether the content B satisfies the combination condition of the content A.

As the second method, the judgment may be made based on checking information that is stored in the later-discussed checking information storage unit 15 or the checking information storage device 400 provided outside the information processing apparatus 100. The checking information may be a black list containing the names of companies that are not allowed to be combined with, a white list containing the names of companies that are allowed to be combined with, genre and rating information of the contents, and the like. By comparing this checking information with the combination condition, whether the combination condition is satisfied can be judged.

For example, the combination condition of the content A includes a rating restriction, but the metadata of the content B does not include any rating information. Then, the rating information of the content B is acquired from the checking information in the checking information storage unit 15 or the checking information storage device 400 to judge whether the content B satisfies the combination condition of the content A.

The checking information storage unit 15 is a storage device configured to store therein the checking information. The checking information storage device 400 is a server that is provided with a storage device that stores therein the checking information, and offers checking information (such as rating information of a certain content) to the combination controlling unit 14 by way of the not-shown network, in response to an inquiry from the combination controlling unit 14.

As the third method, whether the combination condition is satisfied may be judged based on the resources of each content that are analyzed by the resource analyzing unit 16. The resource analyzing unit 16 analyzes the resources of the combination target contents by use of conventional technologies such as character recognition, image recognition, and sound recognition, and outputs the analysis result to the combination condition judging unit 13.

For example, the combination condition of the content A contains restrictions on company names, but no metadata is included in the content B. Then, the resource analyzing unit 16 determines whether-character strings extracted from the resource of the content B (such as a text, images, sound, and video) include a restricted company name. Whether the content B satisfies the combination condition of the content A can be thereby judged.

When the combination conditions of two contents that are given different priorities (contents A and B) are judged with any of the above judgment methods, the results can be represented as shown in FIG. 5. It is assumed here that the priority of the content A is higher than that of the content B. When the combination condition is satisfied, it means that the combination is allowed (the same holds hereinafter).

As indicated in FIG. 5, when the combination condition of the higher-priority content with respect to the lower-priority content (content A→content B) and the combination condition of the lower-priority content with respect to the higher-priority content (content B→content A) are both satisfied, the combination condition judging unit 13 notifies the combination controlling unit 14, as the judgment result, that there is no content to be removed. Then, the combination controlling unit 14 does not have to edit the output rule, and the combination of the contents A and B is established. The structure may be configured in such a manner that the judgment result is not written into the internal buffer in this situation.

On the other hand, when the combination condition of the higher-priority content with respect to the lower-priority content (content A→content B) is satisfied, while the combination condition of the lower-priority content with respect to the higher-priority content (content B→content A) is not satisfied, the combination condition judging unit 13 notifies the combination controlling unit 14 as the judgment result that the content B should be removed. Then, the combination controlling unit 14 edits the output setting for the content B in the output rule so that the combination condition can be satisfied, and thus the combination result is the content A only.

Similarly, when the combination condition of the higher-priority content with respect to the lower-priority content (content A→content B) is not satisfied, while the combination condition of the lower-priority content with respect to the higher-priority content (content B→content A) is satisfied, the combination condition judging unit 13 notifies the combination controlling unit 14 as the judgment result that the content B should be removed. When neither the combination condition of the higher-priority content with respect to the lower-priority content (content A→content B) nor the combination condition of the lower-priority content with respect to the higher-priority content (content B→content A) is satisfied, the combination condition judging unit 13 also notifies the combination controlling unit 14 as the judgment result that the content B should be removed. The combination controlling unit 14 thereby edits the output setting for the content B in the output rule to make the combination condition satisfied. Hence, in both of the situations, the combination result is the content A only.

In the combination condition judging unit 13 and the combination controlling unit 14, the combination conditions of the contents designated in the play list are judged sequentially in accordance with the priority order defined in the priority list, and the output setting of a content that is judged as not being allowed to be combined with is removed from the output rule. Thus, the output rule including only contents that are allowed to be combined is generated.

When three contents or more are to be combined, the judgment is made in the following procedure. First, whether the combination conditions are satisfied is judged for the two highest-priority contents in accordance with the above procedure. Then, the combination condition of any content that is judged as being allowed to be combined with and the combination condition of the next-higher-priority content are judged in accordance with the above procedure. This process is conducted sequentially on all the contents designated in the play list so that the judgment can be completed on the combination conditions of the three contents or more.

It is assumed, for example, that in addition to the contents A and B indicated in FIG. 5, a content C (where its priority is lower than that of the content B) is listed in the play list. If the judgment result regarding the combination conditions of the contents A and B is "allowed to combine the contents A and B", the content C should be compared with each of the contents A and B.

In FIG. 1, the information combining unit 17 combines the resources of the contents designated in the play list in accordance with the output rule edited by the combination controlling unit 14, and outputs the resultant data to an external device. The resultant data may be output to a display device such as an LCD as image or audio data, or converted to video data and then distributed by way of a network or TV broadcast. It may be converted to a drawing instruction and sent to another device or program.

The entire operation of the information processing apparatus 100 is now explained with reference to FIGS. 6 to 8. FIG. 6 is a flowchart for showing the procedure of an information combining process executed by the units of the information processing apparatus 100. First, the combination condition judging unit 13 reads a scenario from the scenario storage 12 at a specific timing (step S11). The timing at which the combination condition judging unit 13 initiates the process is not specifically limited. For example, the timing may be when the playback of the scenario is instructed by way of an operating unit 22 that will be described later, or when a timer or the like registers a specific time.

Next, the combination condition judging unit 13 reads contents designated in the play list from the content storage 11 (step S12), and sets the highest-priority content and the second-highest-priority content to a process target pair with reference to the priority list in the scenario (step S13).

Thereafter, the combination condition judging unit 13 sets the lower-priority content of the process target content pair to a judgment target with respect to the combination condition included in the higher-priority content (step S14), and executes a combination condition judging process on the output rules of the two contents at step S15. The combination condition judging process is explained below with reference to FIG. 7.

Figure 7:
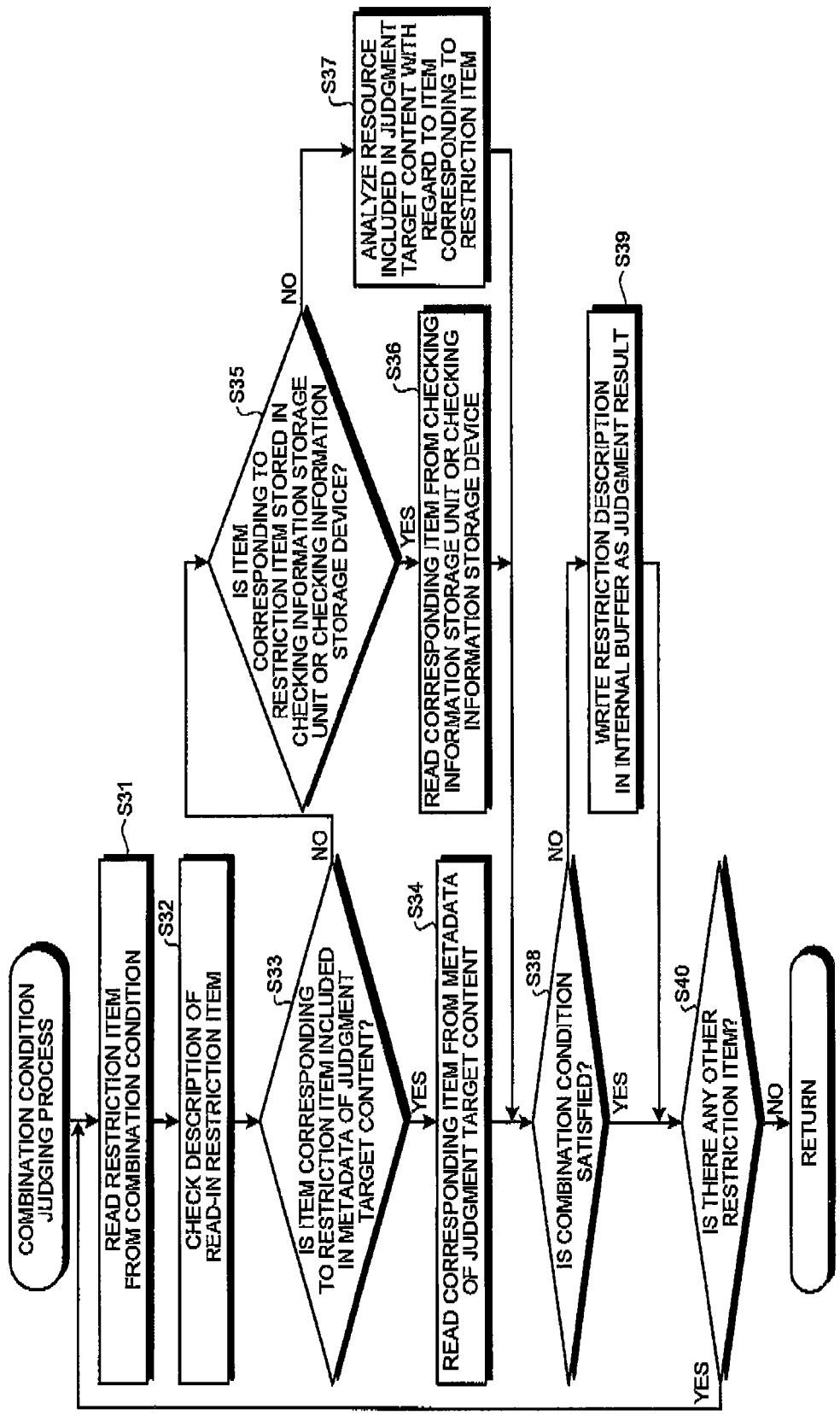
FIG. 7 is a flowchart of the procedure of a combination condition judging process.

In FIG. 7, first, the combination condition judging unit 13 reads a restriction item described in the combination condition (step S31), and checks what is restricted by this restriction item (step S32). For example, if the restriction item is to restrict the rating, the combination condition judging unit 13 determines that this restriction items relates to "rating".

Then, the combination condition judging unit 13 judges whether an item corresponding to the restriction item checked at step S32 is included in the metadata of the judgment target content (step S33). When it is included in the metadata of the judgment target content (yes at step S33), the combination condition judging unit 13 reads the corresponding item from the metadata of the judgment target content (step S34), and compares it with the combination condition of the judgment reference to judge whether the combination condition is satisfied (step S38).

When it is judged at step S33 that an item corresponding to the restriction item is not included in the metadata of the judgment target content (no at step S33), the combination condition judging unit 13 judges whether the item corresponding to the restriction item is stored for the judgment target content in the checking information storage unit 15 or the checking information storage device 400 (step S35).

When the item corresponding to the restriction item is stored for the judgment target content in the checking information storage unit 15 or the checking information storage device 400 (yes at step S35), the combination condition judging unit 13 reads this item from the checking information storage unit 15 or the checking information storage device 400 (step S36), and compares it with the combination condition of the judgment reference to judge whether this combination condition is satisfied (step S38).

When it is determined at step S35 that no item corresponding to the restriction item is stored in the checking information storage unit 15 or the checking information storage device 400 (no at step S35), the resource analyzing unit 16 analyzes the resources included in the judgment target content with respect to the item corresponding to the restriction item, and outputs the analysis result to the combination condition judging unit 13 (step S37). The combination condition judging unit 13 compares the analysis result received from the resource analyzing unit 16 with the combination condition of the judgment reference to judge whether the combination condition is satisfied (step S38).

When, as a result of the judgment at step S38, the combination condition judging unit 13 determines that the combination condition is not satisfied (no at step S38), the judgment result instructing the modification of the output setting described in the output rule for the judgment target content to make the combination condition satisfied is written in the internal buffer (step S39), and the system proceeds to step S40.

On the other hand, when it is determined at step S38 that the combination condition is satisfied (yes at step S38), the combination condition judging unit 13 immediately proceeds to step S40. At step S40, the combination condition judging unit 13 judges whether the combination condition of the judgment reference includes any other restriction item. When it is judged that such an item is included (yes at step S40), the combination condition judging unit 13 returns to step S31, and reads the restriction item. When it is judged that no other restriction item is included in the combination condition of the judgment reference (no at step S40), the system proceeds to the process of step S16 in FIG. 6.

In FIG. 6, the combination controlling unit 14 executes the output rule editing process at step S16, based on the processing result of step S15. With reference to FIG. 8, the output rule editing process is explained below.

Figure 8:
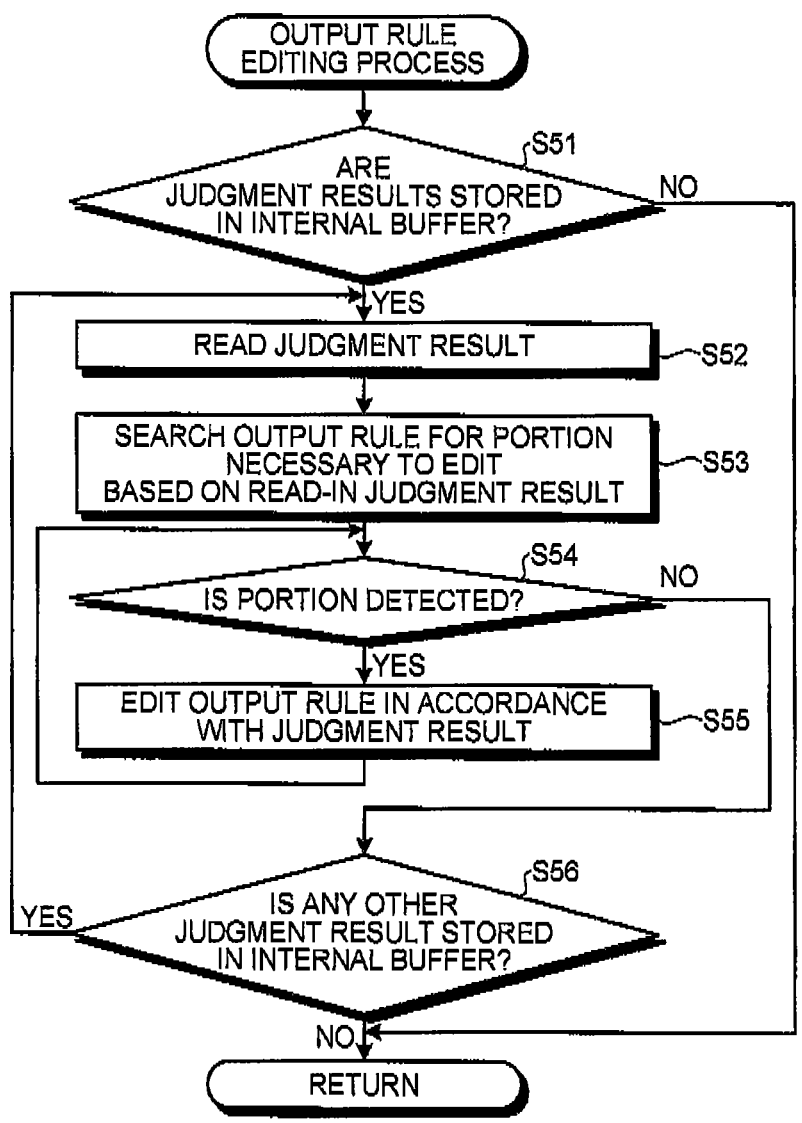
FIG. 8 is a flowchart of the procedure of an output rule editing process.

In FIG. 8, first, the combination controlling unit 14 judges whether judgment results are stored in the internal buffer (step S51). If no judgment result is stored in the internal buffer (no at step S51), the system immediately proceeds to step S17 of FIG. 6.

When it is judged at step S51 that judgment results are stored in the internal buffer (yes at step S51), the combination controlling unit 14 reads one of the judgment results from the internal buffer (step S52).

Thereafter, the combination controlling unit 14 searches the output rule for a portion that needs to be edited (output setting) based on the judgment result read at step S52 (step S53). When detecting such a portion as a result of the search at step S53 (yes at step S54), the combination controlling unit 14 edits the output rule in accordance with the judgment result (step S55). The process of yes at step S54→step S55 is repeated until all the editing target portions are edited.

When editing of all the target portions is completed (no at step S54), the combination controlling unit 14 judges whether any other judgment result is stored in the internal buffer (step S56). When any other judgment result is stored in the internal buffer (yes at step S56), the system returns to the process of step S52, where the target judgment result is read in. When no other judgment result is stored in the internal buffer (no at step S56), the system proceeds to the process of step S17 in FIG. 6.

In FIG. 6, when the combination condition judging unit 13 sets, as a judgment target, the higher-priority content of the processing target content pair with respect to the combination condition included in the lower-priority content (step S17), the combination condition judging unit 13 executes the combination condition judging process (step S18). The combination controlling unit 14 executes the output rule editing process, based on the processing result of step S18 (step S19). The combination condition judging process executed at step S18 is the same as the combination condition judging process explained with reference to FIG. 7, and the output rule editing process executed at step S19 is same as the output rule editing process explained with reference to FIG. 8. Thus, the explanation thereof is omitted.

Thereafter, the combination condition judging unit 13 judges whether any lower-priority content is included in the priority list (step S20). When it is judged that another content is included (yes at step S20), the combination condition judging unit 13 sets each of the contents judged in the previous process as being allowed to be combined and the other content as a processing target pair (step S21). Then, the system returns to the process of step S14 to execute the process of steps S14 to S19 on each pair.

At step S20, when the combination condition judging unit 13 judges that no other content is designated in the priority list (no at step S20), the information combining unit 17 combines the resources of the contents designated in the play list in accordance with the output rule (step S22), and outputs the resultant data to the external device (step S23). Then, the process is terminated.

The information processing apparatus 100 according to the present embodiment restricts contents that are to be combined together, based on the combination conditions included in the contents. Thus, usage control can be performed as desired by the content providers when multiple contents are to be presented in combination.

[Hardware Structure of Information Processing Apparatus]

Figure 9:
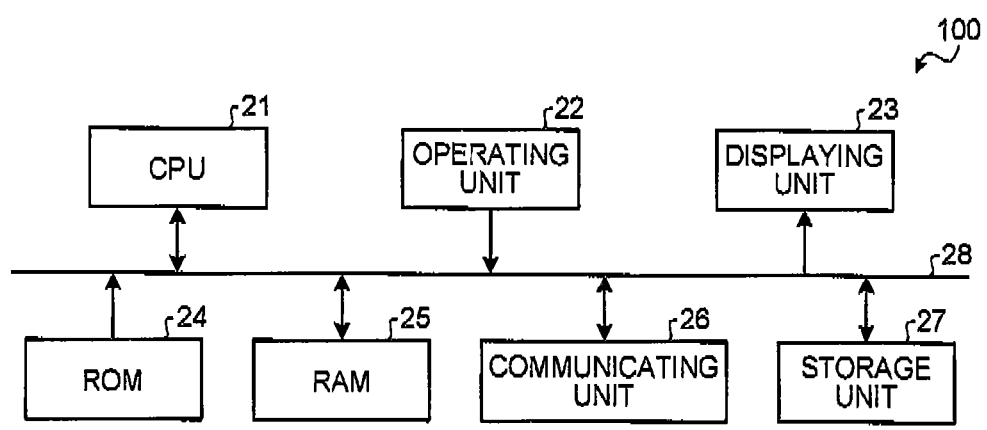
FIG. 9 is a diagram for illustrating a hardware structure of the information processing apparatus illustrated in FIG. 1.

FIG. 9 is a diagram for illustrating a hardware structure of the information processing apparatus 100. The information processing apparatus 100 includes a central processing unit (CPU) 21, the operating unit 22, a displaying unit 23, a read only memory (ROM) 24, a random access memory (RAM) 25, a communicating unit 26, and a storage unit 21, and these units are connected to one another by a bus 28.

The CPU 21 executes various processes by using a specific area of the RAM 25 as a workspace, in cooperation with specific programs that are stored in advance in the ROM 24 or the storage unit 27, and performs overall control on the units of the information processing apparatus 100.

The CPU 21 also realizes all the above functional units (the combination condition judging unit 13, the combination controlling unit 14, the resource analyzing unit 16, and the information combining unit 17), in cooperation with the programs stored in advance in the ROM 24 or the storage unit 27.

The operating unit 22 includes various input keys, a pointing device, and the like, and outputs to the CPU 21 an instruction signal input by the user.

The displaying unit 23 is a display device comprising the liquid crystal display (LCD), and displays various types of information based on display signals received from the CPU 21. The displaying unit 23 may form a touch panel together with the operating unit 22.

The ROM 24 stores therein programs for controlling the information processing apparatus 100 and various kinds of setting information in a non-rewritable manner.

The RAM 25 is a volatile storage device such as a SDRAM, offering a workspace of the CPU 21 and serving as a buffer (the internal buffer in the above description).

The communicating unit 26 is an interface for communicating with external devices, outputting various types of information received from the external devices such as the content providing device 200, the scenario providing device 300, and the checking information storage device 400 to the CPU 21, and transmitting various types of information output by the CPU 21 to the external devices.

The storage unit 27 includes a magnetically- or optically-recordable non-volatile storage device to store programs for controlling the information processing apparatus 100 and various kinds of setting information in a rewritable manner. The storage unit 27 serves as the content storage 11, the scenario storage 12, and the checking information storage unit 15.

The exemplary embodiments of the present invention have been explained, but the invention is not limited thereto. Any modifications, replacements, or additions may be made to the present invention without departing from a scope of the invention.

For example, a program for the above process may be offered in a computer-readable recording medium. Any recording medium that is configured to record programs therein and to be read by a computer, such as a magnetic disk, an optical disk (e.g., a CD-ROM, a CD-R, and a DVD), a magneto-optical disk (e.g., an MO), and a semiconductor memory, can be adopted, and any recording format can be adopted.

Furthermore, the program for executing the above process may be stored on a computer connected to a network such as the Internet and downloaded via the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a content storage unit that stores a plurality of content pieces each including a resource and a combination condition, the resource comprising data in a form selected from the group consisting of text file, an image file, an audio file, a video file, and any combination of these files, each of the resources being individually usable, the combination condition specifying as to whether a resource included in a corresponding one of the content pieces is allowed to be combined with another resource included in another of the content pieces;
a scenario storage unit that stores a scenario including a play list specifying combination target content pieces from among the content pieces, an output rule defining a combination method for combining the resources respectively included in the combination target content pieces, and a priority list defining priorities of the combination target content pieces; and
a computer in communication with the content storage unit and the scenario storage unit, the computer being programmed with:
a judging unit that judges whether the combination method defined in the output rule satisfies the combination condition of each of the combination target content pieces specified in the play list, in order of the priorities defined in the priority list;
an editing unit that edits the output rule based on a judgment result obtained by the judging unit in such a manner that the combination condition of each of the content pieces specified in the play list is satisfied; and
a combining unit that combines the resources of the content pieces specified in the play list, based on the combination method of the output rule edited by the editing unit, wherein
each of the priority defines which one of the resource of a first content piece of the combination target content pieces specified by the play list and the resource of a second content piece of the combination target content pieces specified by the play list is used prior to the other of the resource of the first content piece and the resource of the second content piece when a first determination result conflicts with a second determination result, the first determination result indicating whether the combination method defined by the output rule satisfies the combination condition of the first content piece, and the second determination result indicating whether the combination method defined by the output rule satisfies the combination condition of the second content piece,
the editing unit outputs, as an editing result, the one of the resource of the first content piece and the resource of the second content piece which is defined by the priority to be used prior to the other of the resource of the first content piece and the resource of the second content piece and does not output the other of the resource of the first content piece and the resource of the second content piece when the first determination result conflicts with the second determination result or when the first determination result indicates that the combination method defined by the output rule does not satisfy the combination condition of the first content piece and the second determination result indicates that the combination method defined by the output rule does not satisfy the combination condition of the second content piece.

2. The apparatus according to claim 1, wherein the judging unit defines a pair of a higher-priority content piece and a lower-priority content piece as a unit of processing, and judges whether the combination method defined in the output rule for the content pieces of the unit of processing satisfies the combination condition included in each of the content pieces.

3. The apparatus according to claim 1, wherein the judging unit notifies the editing unit, as a judgment result, of removal of the lower-priority content piece, when the judging unit judges that a lower-priority content piece does not satisfy a combination condition included in a higher-priority content piece with respect to the combination method defined in the output rule for the higher-priority content piece and the lower-priority content piece.

4. The apparatus according to claim 3, wherein the judging unit notifies the editing unit, as the judgment result, of the removal of the lower-priority content piece, when the judging unit judges that the higher-priority content piece does not satisfies a combination condition included in the lower-priority content piece.

5. The apparatus according to claim 1, wherein
each of the content pieces further includes metadata in which information on the content piece is described; and
the judging unit compares a specific item defined in the combination condition for the combination target content piece with description of the metadata in each of the content pieces specified in the play list, when making a judgment on the combination method defined in the output rule.

6. The apparatus according to claim 1, further comprising a checking information storage unit that stores checking information that describes information on each of the content pieces stored in the content storage unit, wherein the judging unit compares a specific item defined in the combination condition for the combination target content piece with description of the checking information stored in the checking information storage unit for the combination target content piece, when making a judgment on the combination method defined in the output rule.

7. The apparatus according to claim 1, wherein the computer is further programmed with an analyzing unit that analyzes the resources included in the content pieces, wherein the judging unit compares a specific item defined in the combination condition for the combination target content piece with an analysis result obtained by the analyzing unit for the combination target content piece, when making a judgment on the combination method defined in the output rule.

8. An information processing method implemented in an information processing apparatus that combines and outputs an individually usable resource of data in form selected from the group consisting of text file, an image file, an audio file, a video file, and any combination of these files, the apparatus includes a content storage unit that stores a plurality of content pieces each including the resource and a combination condition that specifies as to whether a resource included in a corresponding one of the content pieces is allowed to be combined with another resource included in another of the content pieces; and a scenario storage unit that stores a scenario including a play list specifying combination target content pieces from among the content pieces, an output rule defining a combination method for combining the resources respectively included in the combination target content pieces, and a priority list defining priorities of the combination target content pieces, the method comprising:

judging whether the combination method defined in the output rule satisfies the combination condition of each of the content pieces specified in the play list, in order of the priorities defined in the priority list;

editing the output rule based on a judgment result obtained by the judging in such a manner that the combination condition of each of the combination target content pieces specified in the play list is satisfied;

combining the resources of the content pieces specified in the play list, based on the combination method of the output rule edited by the editing;

defining which one of the resource of a first content piece of the combination target content pieces specified by the play list and the resource of a second content piece of the combination target content pieces specified by the play list is used prior to the other of the resource of the first content piece and the resource of the second content piece when a first determination result conflicts with a second determination result, the first determination result indicating whether the combination method defined by the output rule satisfies the combination condition of the first content piece, and the second determination result indicating whether the combination method defined by the output rule satisfies the combination condition of the second content piece; and outputting, as an editing result, the one of the resource of the first content piece and the resource of the second content piece which is defined by the priority to be used prior to the other of the resource of the first content piece and the resource of the second content piece and does not output the other of the resource of the first content piece and the resource of the second content piece when the first determination result conflicts with the second determination result or when the first determination result indicates that the combination method defined by the output rule does not satisfy the combination condition of the first content piece and the second determination result indicates that the combination method defined by the output rule does not satisfy the combination condition of the second content piece.

9. A computer program product having a non-transitory computer readable medium including programmed instructions for processing information, when executed by a computer, wherein the computer includes a content storage unit that stores a plurality of content pieces each including resources and a combination condition, the resources comprising data in a form selected from the group consisting of text file, an image file, an audio file, a video file, and any combination of these files, each of the resources being individually usable, the combination condition specifying as to whether a resource included in a corresponding one of the content pieces is allowed to be combined with another resource included in another of the content pieces; and a scenario storage unit that stores a scenario including a play list specifying combination target content pieces from among the content pieces, an output rule defining a combination method for combining the resources respectively included in the combination target content pieces, and a priority list defining priorities of the combination target content pieces, the instructions cause the computer to perform:

judging whether the combination method defined in the output rule satisfies the combination condition of each of the content pieces specified in the play list, in order of the priorities defined in the priority list;

editing the output rule based on a judgment result obtained by the judging in such a manner that the combination condition of each of the combination target content pieces specified in the play list is satisfied;

combining the resources of the content pieces specified in the play list, based on the combination method of the output rule edited by the editing;

defining which one of the resource of a first content piece of the combination target content pieces specified by the play list and the resource of a second content piece of the combination target content pieces specified by the play list is used prior to the other of the resource of the first content piece and the resource of the second content piece when a first determination result conflicts with a second determination result, the first determination result indicating whether the combination method defined by the output rule satisfies the combination condition of the first content piece, and the second determination result indicating whether the combination method defined by the output rule satisfies the combination condition of the second content piece; and outputting, as an editing result, the one of the resource of the first content piece and the resource of the second content piece which is defined by the priority to be used prior to the other of the resource of the first content piece and the resource of the second content piece and does not output the other of the resource of the first content piece and the resource of the second content piece when the first determination result conflicts with the second determination result or when the first determination result indicates that the combination method defined by the output rule does not satisfy the combination condition of the first content piece and the second determination result indicates that the combination method defined by the output rule does not satisfy the combination condition of the second content piece.

\* \* \* \* \*